(12) United States Patent
Hart et al.

(10) Patent No.: US 11,489,794 B2
(45) Date of Patent: Nov. 1, 2022

(54) SYSTEM FOR CONFIGURATION AND INTELLIGENT TRANSMISSION OF ELECTRONIC COMMUNICATIONS AND INTEGRATED RESOURCE PROCESSING

(71) Applicant: BANK OF AMERICA CORPORATION, Charlotte, NC (US)

(72) Inventors: Sean Hart, Fort Mill, SC (US); Kristine Lynn Sykes Spadaccia, Chester, VA (US); Rudolph A. Serrao, Basking Ridge, NJ (US); Tricia A. Ciavolella, Long Valley, NJ (US); Christine Lee Fitzgerald, Boston, MA (US); Robert F. Arimenta, Jr., New York, NY (US); Timothy Albert Paul, Massapequa, NY (US); Matthew Brian Wohl, Hamilton, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 56 days.

(21) Appl. No.: 17/089,553

(22) Filed: Nov. 4, 2020

(65) Prior Publication Data

US 2021/0136014 A1 May 6, 2021

Related U.S. Application Data

(60) Provisional application No. 62/930,314, filed on Nov. 4, 2019.

(51) Int. Cl.
*H04L 51/046* (2022.01)
*H04L 51/10* (2022.01)
(Continued)

(52) U.S. Cl.
CPC ............ *H04L 51/046* (2013.01); *H04L 51/08* (2013.01); *H04L 51/10* (2013.01); *H04L 51/224* (2022.05)

(58) Field of Classification Search
CPC ....... H04L 51/046; H04L 51/08; H04L 51/10; H04L 51/24; H04L 51/36
See application file for complete search history.

(56) References Cited

U.S. PATENT DOCUMENTS

| 5,818,908 | A | 10/1998 | Kaplan |
| 5,970,446 | A | 10/1999 | Goldberg et al. |
| (Continued) | | | |

OTHER PUBLICATIONS

What is Google Assistant, how does it work, and when can you use it? Elyse Betters, Oct. 18, 2016, APPS.
(Continued)

*Primary Examiner* — Austin J Moreau
(74) *Attorney, Agent, or Firm* — Moore & Van Allen PLLC; Nicholas C. Russell

(57) ABSTRACT

Embodiments of the invention are directed to a central communication hub, structured for integrating a plurality of electronic communication channels associated with the user, such that the user can utilize disparate electronic communication channels via a central user application. The communications hub is structured for identifying, retrieving and processing electronic communications associated with the user, as well as, automatically initiating actions associated with the communications. The communications hub is also structured for proactively transmitting alerts associated with the electronic communications. The central communication hub also comprises a system for centralized management of records, structured for secure and convenient storage, sharing and retrieval of user records. This can include intelligent automated management of user records.

18 Claims, 5 Drawing Sheets

(51) Int. Cl.
*H04L 51/08* (2022.01)
*H04L 51/224* (2022.01)

(56) References Cited

U.S. PATENT DOCUMENTS

| | | | |
|---|---|---|---|
| 6,305,603 B1 | 10/2001 | Grunbok et al. | |
| 6,466,654 B1 | 10/2002 | Cooper et al. | |
| 6,757,362 B1 | 6/2004 | Cooper et al. | |
| 7,711,462 B2 | 5/2010 | Daniels et al. | |
| 8,781,836 B2 | 7/2014 | Foo et al. | |
| 9,081,411 B2 | 7/2015 | Kains et al. | |
| 9,085,303 B2 | 7/2015 | Wolverton et al. | |
| 9,262,612 B2 | 2/2016 | Cheyer | |
| 9,318,108 B2 | 4/2016 | Gruber et al. | |
| 9,386,395 B1 * | 7/2016 | Delker | H04W 4/023 |
| 9,502,029 B1 | 11/2016 | Bell et al. | |
| 9,602,405 B1 | 3/2017 | Sharma et al. | |
| 10,958,600 B1 * | 3/2021 | Annadata | H04L 51/04 |
| 11,270,246 B2 * | 3/2022 | Bounasser | G06Q 10/08355 |
| 2002/0029203 A1 | 3/2002 | Pelland et al. | |
| 2008/0015864 A1 | 1/2008 | Ross et al. | |
| 2008/0091406 A1 | 4/2008 | Baldwin et al. | |
| 2011/0040707 A1 | 2/2011 | Theisen et al. | |
| 2011/0099536 A1 | 4/2011 | Coldicott et al. | |
| 2012/0022860 A1 | 1/2012 | Lloyd et al. | |
| 2012/0034904 A1 | 2/2012 | LeBeau et al. | |
| 2012/0035908 A1 | 2/2012 | Lebeau et al. | |
| 2012/0265528 A1 | 10/2012 | Gruber et al. | |
| 2012/0271676 A1 | 10/2012 | Aravamudan et al. | |
| 2013/0152092 A1 | 6/2013 | Yadgar | |
| 2013/0290710 A1 * | 10/2013 | Broder | G06Q 30/04 713/168 |
| 2014/0317502 A1 | 10/2014 | Brown et al. | |
| 2015/0088514 A1 | 3/2015 | Typrin | |
| 2015/0121464 A1 | 4/2015 | Hughes, Jr. et al. | |
| 2016/0070581 A1 | 3/2016 | Soon-Shiong | |
| 2017/0235454 A1 * | 8/2017 | Selfridge | G06F 3/0484 715/744 |
| 2017/0279906 A1 | 9/2017 | Laird-McConnell et al. | |
| 2018/0084111 A1 | 3/2018 | Pirat et al. | |
| 2018/0114127 A1 | 4/2018 | Cole et al. | |
| 2020/0228452 A1 | 7/2020 | Boss et al. | |

OTHER PUBLICATIONS

Morisio et al. "Multi-channel Conversational Agent for Personalized Music Recommendations", 2018, Politecnico Di Tornino, p. 1-90. (Year: 2018).

* cited by examiner

SYSTEM FOR CONFIGURATION AND INTELLIGENT TRANSMISSION OF ELECTRONIC COMMUNICATIONS AND INTEGRATED RESOURCE PROCESSING

CROSS-REFERENCE TO PRIORITY APPLICATION

This application claims priority to and the benefit of U.S. Provisional Patent Application Ser. No. 62/930,314 entitled "System for configuration and intelligent transmission of electronic communications and integrated resource processing" filed on Nov. 4, 2019, which is hereby incorporated by reference in its entirety.

BACKGROUND

Electronic communications associated with technology applications is increasingly widespread. Furthermore, in conventional systems, electronic communications are typically associated with numerous disparate communication channels, with each communication channel being associated with a specific communication media, technology application, protocols, communication transmission timing, and/or the like. Existing systems require a user to navigate multiple applications to access, view and perform electronic activities associated with discrete electronic communications on electronic devices. As such, a user is typically not only required to access each communication channel separately requiring increased processing and memory resources, but also access the communication channel repeatedly to access, view and perform electronic activities associated with electronic communications on electronic devices. Moreover, execution of the electronic activities requires the user to be adept with various distinct functions and technology elements of a myriad applications. As such, conducting electronic activities via the foregoing conventional system requires operations across several disparate communication channels, which may not be available to the user. Moreover, even if the disparate communication channels are available to the user, conducting electronic activities via the disparate communication channels is often extremely time consuming, cumbersome and unwieldy.

Accordingly, there is a need for an intelligent, proactive and responsive system that is structured to integrate electronic communication data from numerous disparate communication channels, such that the activities associated with the disparate communication channels can be operated in an integrated manner, without requiring access to the each of the disparate communication channels. The previous discussion of the background to the invention is provided for illustrative purposes only and is not an acknowledgement or admission that any of the material referred to is or was part of the common general knowledge as at the priority date of the application.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing systems, computer program products and methods for configuration and intelligent transmission of electronic communications and integrated resource processing, comprising a multi-channel cognitive resource platform for performing electronic activities associated with user electronic communications and records in an integrated manner from a single interface. In some instances, the system comprises: at least one memory device with computer-readable program code stored thereon, at least one communication device, at least one processing device operatively coupled to the at least one memory device and the at least one communication device, wherein executing the computer-readable program code is typically configured to cause the at least one processing device to perform, execute or implement one or more features or steps of the invention such as: providing a multi-channel cognitive resource application on a user device associated with the user, wherein the multi-channel cognitive resource application is configured to present a central user interface on a display device of the user device; determining one or more electronic communications associated with the user, wherein each electronic communication is associated with a communication channel; presenting, via the central user interface, the one or more electronic communications to user; determining a first user activity associated with a first electronic communication of the one or more electronic communications; and initiating completion of the first user activity within the central user interface of the multi-channel cognitive resource application.

In some embodiments, or in combination with any of the previous embodiments, one or more electronic communications comprise the first electronic communication associated with a first communication channel, and a second electronic communication associated with a second communication channel different from the first communication channel.

In some embodiments, or in combination with any of the previous embodiments, the one or more electronic communications comprise one or more records associated with the user.

In some embodiments, or in combination with any of the previous embodiments, determining the first user activity associated with the first electronic communication of the one or more electronic communications, further comprises: parsing the first electronic communication of the one or more electronic communications to determine whether the first electronic communication comprises one or more activity keywords; and determining that the one or more activity keywords are associated with the first user activity.

In some embodiments, or in combination with any of the previous embodiments, initiating completion of the first user activity within the central user interface further comprises: conducting, via the central user interface, a first conversation with the user, wherein conducting the first conversation comprises: (i) receiving, via the central user interface, a first activity input from the user regarding the first user activity, wherein the activity input is received through a first communication medium; and (ii) presenting, via the central user interface, the received first activity input from the user.

In some embodiments, or in combination with any of the previous embodiments, initiating completion of the first user activity within the central user interface further comprises: determining one or more parameters required for completing the first user activity; parsing the one or more electronic communications to determine whether the one or more electronic communications comprise at least one of the one or more parameters; and in response to determining that the one or more electronic communications comprise at least one of the one or more parameters, performing the first user activity.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
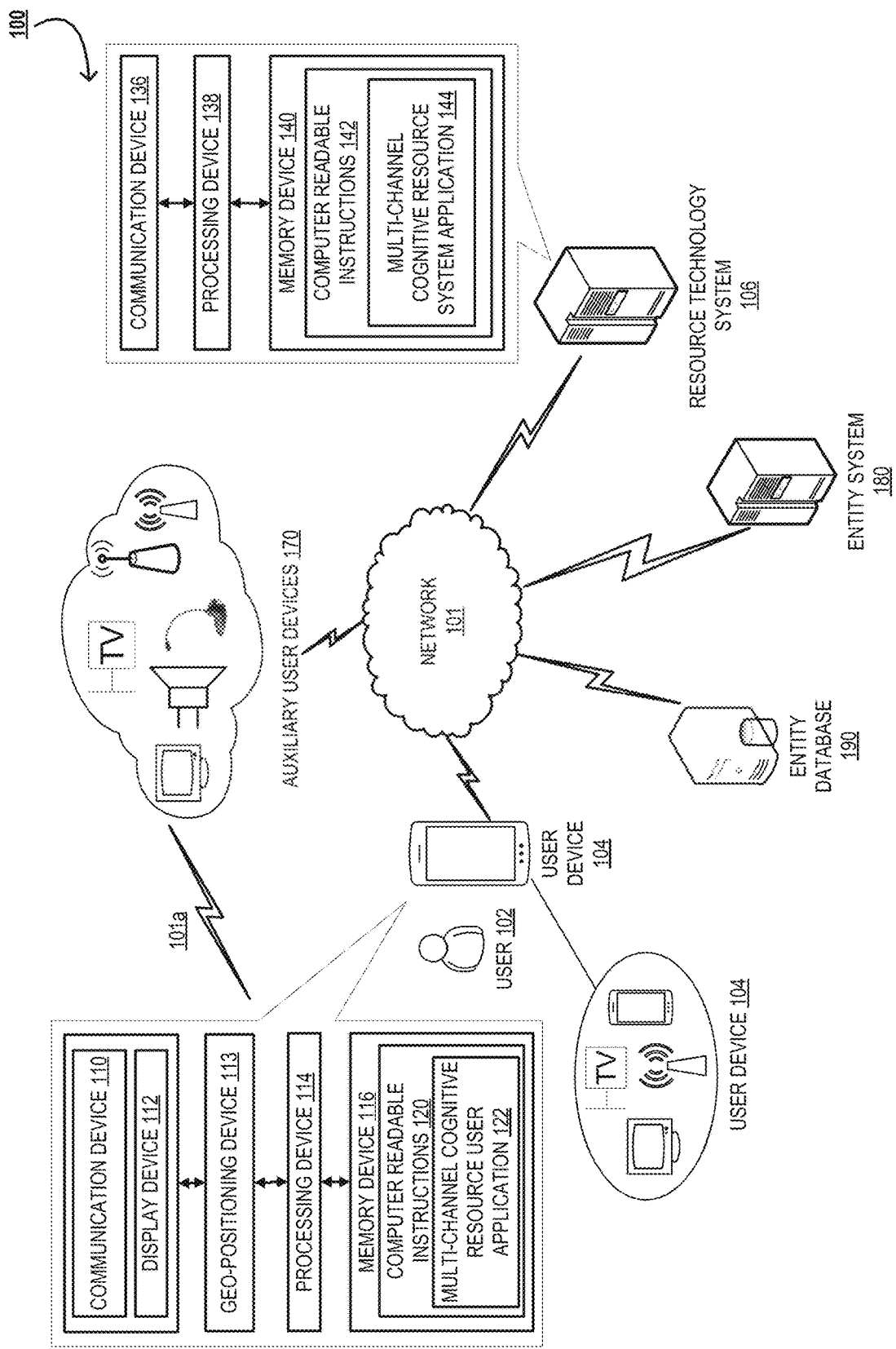
Figure 2:
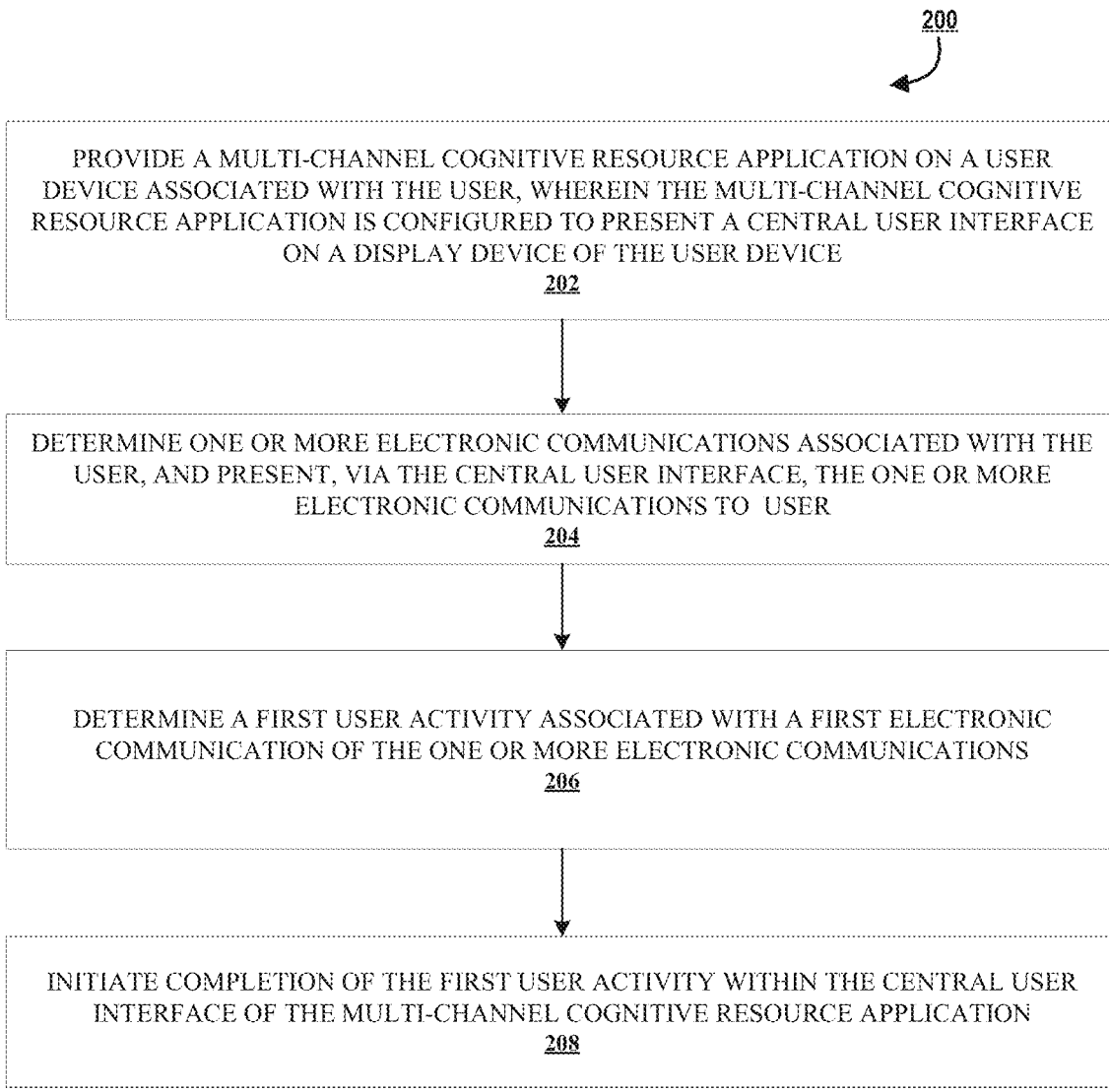
Figure 3:
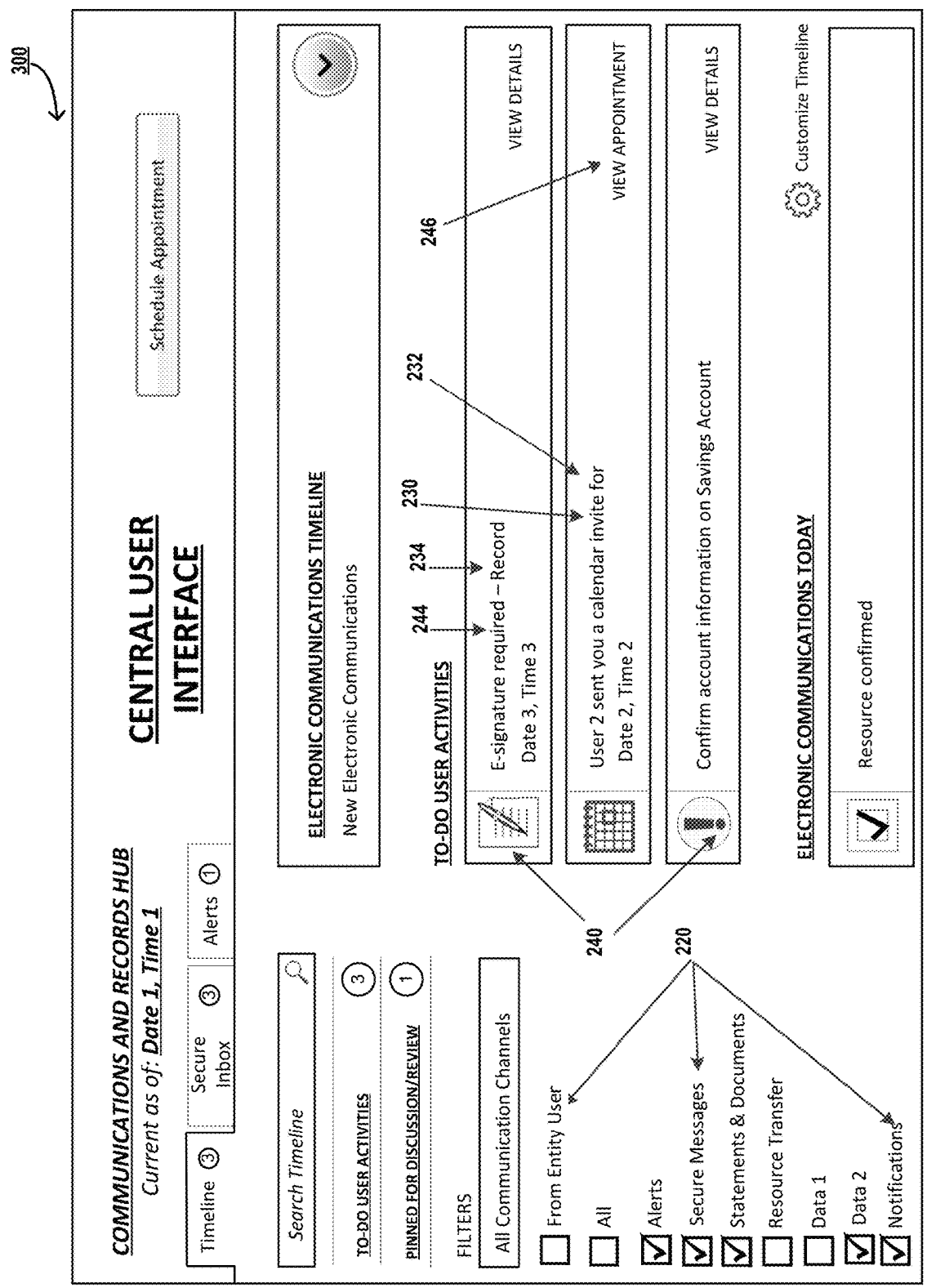
Figure 4:
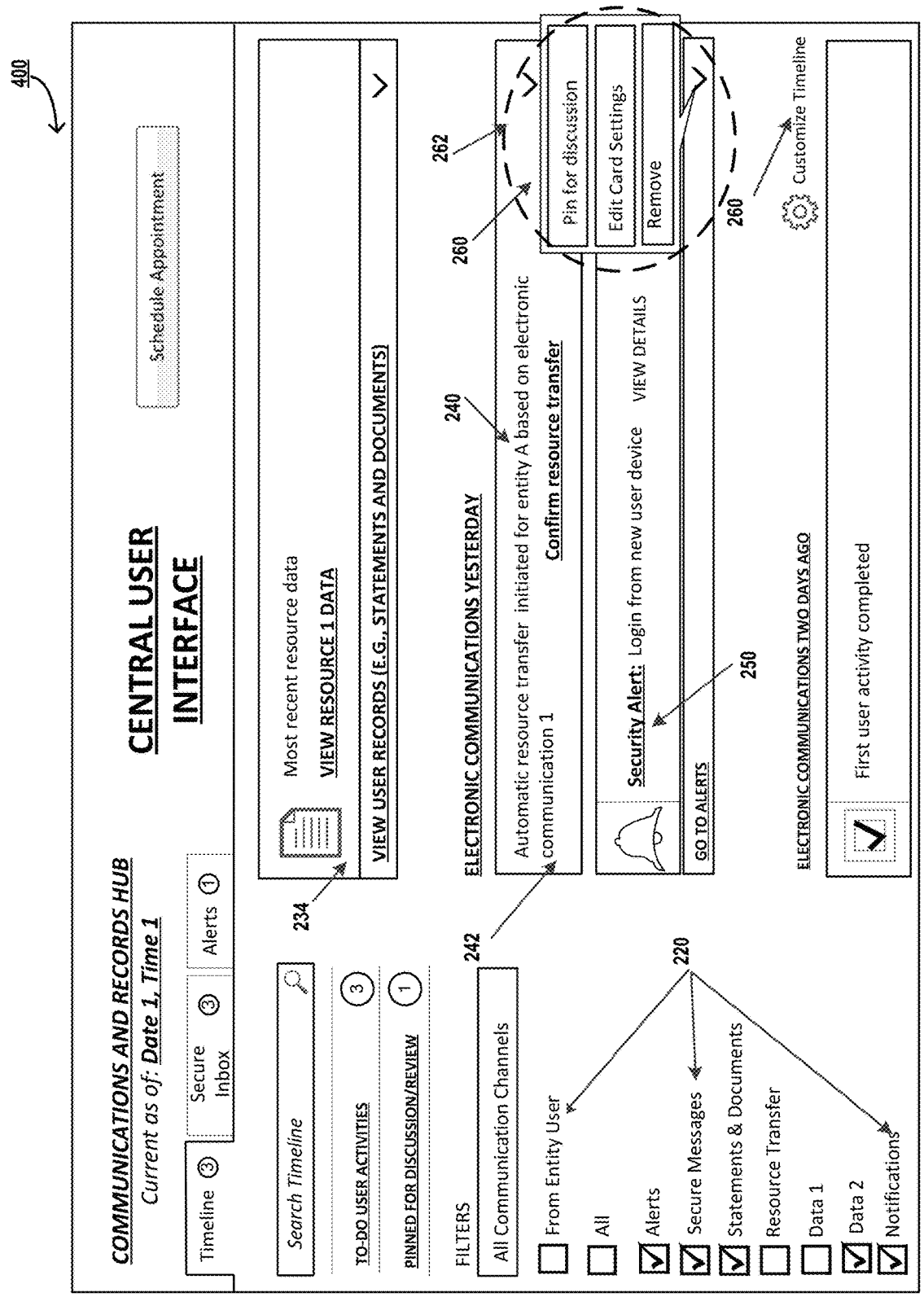
Figure 5:
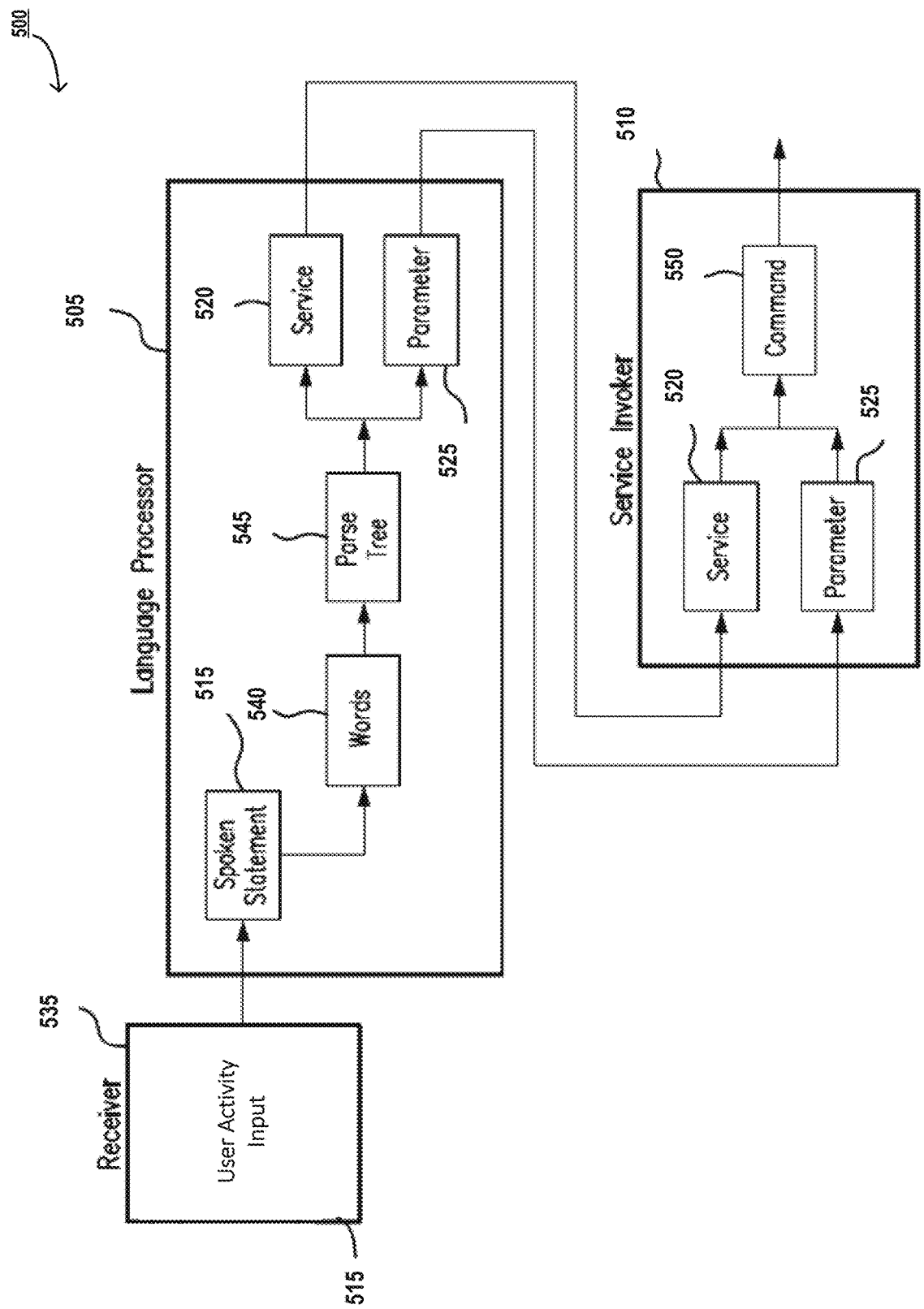

Having thus described embodiments of the invention in general terms, reference will now be made to the accompanying drawings, wherein:

FIG. 1 depicts electronic communication configuration and intelligent transmission, and integrated resource processing platform environment 100, in accordance with one embodiment of the present invention;

FIG. 2 depicts a high-level process flow 200 for intelligent electronic communication configuration and transmission, and integrated resource processing, in accordance with one embodiment of the present invention;

FIG. 3 depicts a schematic diagram 300 of a central user interface, in accordance with one embodiment of the present invention;

FIG. 4 depicts a schematic diagram 400 of a central user interface, in accordance with one embodiment of the present invention; and FIG. 5 depicts a high-level process flow of a language processing module 500 of the multi-channel cognitive resource user application, in accordance with one embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

In some embodiments, an "entity" or "enterprise" as used herein may be any institution or establishment, associated with a network connected resource transfer platform, and particularly geolocation systems and devices. As such, the entity may be any institution, group, association, financial institution, merchant, establishment, company, union, authority or the like.

As described herein, a "user" is an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

In the instances where the entity is a resource entity or a merchant, financial institution and the like, a user may be an individual or entity with one or more relationships, affiliations or accounts with the entity (for example, the merchant, the financial institution). In some embodiments, the user may be an entity or financial institution employee (e.g., an underwriter, a project manager, an IT specialist, a manager, an administrator, an internal operations analyst, bank teller or the like) capable of operating the system described herein. In some embodiments, a user may be any individual or entity who has a relationship with a customer of the entity or financial institution. For purposes of this invention, the term "user" and "customer" may be used interchangeably. A "technology resource" or "account" may be the relationship that the user has with the entity. Examples of technology resources include a deposit account, such as a transactional account (e.g. a banking account), a savings account, an investment account, a money market account, a time deposit, a demand deposit, a pre-paid account, a credit account, a non-monetary user information provided by the user, or the like. The technology resource or account is typically associated with and/or maintained by an entity, and is typically associated with technology infrastructure such that the resource or account may be accessed, modified or acted upon by the user electronically, for example using or transaction terminals, user devices, merchant systems, and the like. In some embodiments, the entity may provide one or more technology instruments or financial instruments to the user for executing resource transfer activities or financial transactions. In some embodiments, the technology instruments/financial instruments like electronic tokens, credit cards, debit cards, checks, loyalty cards, entity user device applications, account identifiers, routing numbers, passcodes and the like are associated with one or more resources or accounts of the user. In some embodiments, an entity may be any institution, group, association, club, establishment, company, union, authority or the like with which a user may have a relationship. As discussed, in some embodiments, the entity represents a vendor or a merchant with whom the user engages in financial (for example, resource transfers like purchases, payments, returns, enrolling in merchant accounts and the like) or non-financial transactions (for resource transfers associated with loyalty programs and the like), either online or in physical stores.

As used herein, a "user interface" may be a graphical user interface that facilitates communication using one or more communication mediums such as tactile communication (such, as communication via a touch screen, keyboard, and the like), audio communication, textual communication and/or video communication (such as, gestures). Typically, a graphical user interface (GUI) of the present invention is a type of interface that allows users to interact with electronic elements/devices such as graphical icons and visual indicators such as secondary notation, as opposed to using only text via the command line. That said, the graphical user interfaces are typically configured for audio, visual and/or textual communication, and are configured to receive input and/or provide output using one or more user device components and/or external auxiliary/peripheral devices such as a display, a speaker, a microphone, a touch screen, a camera, a GPS device, a keypad, a mouse, and/or the like. In some embodiments, the graphical user interface may include both graphical elements and text elements. The graphical user interface is configured to be presented on one or more display devices associated with user devices, entity systems, auxiliary user devices, processing systems and the like.

An electronic activity, also referred to as a "technology activity" or a "user activity", such as a "resource transfer" or "transaction", may refer to any activities or communication between a user or entity and the financial institution, between the user and the entity, activities or communication between multiple entities, communication between technology applications and the like. A resource transfer may refer to a payment, processing of funds, purchase of goods or services, a return of goods or services, a payment transaction, a credit transaction, or other interactions involving a user's resource or account. In the context of a financial institution or a resource entity such as a merchant, a resource transfer may refer to one or more of: transfer of resources/funds between financial accounts (also referred to as "resources"), deposit of resources/funds into a financial account or resource (for example, depositing a check), withdrawal of resources or finds from a financial account, a sale of goods and/or services, initiating an automated teller machine (ATM) or online banking session, an account balance inquiry, a rewards transfer, opening a bank application on a user's computer or mobile device, a user accessing their e-wallet, applying one or more coupons to purchases, or any other interaction involving the user and/or the user's device that invokes or that is detectable by or associated with the financial institution. A resource transfer may also include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like. Unless specifically limited by the context, a "resource transfer," a "transaction," a "transaction event," or a "point of transaction event," refers to any user activity (financial or non-financial activity) initiated between a user and a resource entity (such as a merchant), between the user and the financial instruction, or any combination thereof. In some embodiments, a resource transfer or transaction may refer to financial transactions involving direct or indirect movement of funds through traditional paper transaction processing systems (i.e. paper check processing) or through electronic transaction processing systems. In this regard, resource transfers or transactions may refer to the user initiating a funds/resource transfer between account, funds/resource transfer as a payment for the purchase for a product, service, or the like from a merchant, and the like. Typical financial transactions or resource transfers include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures, and the like.

In accordance with embodiments of the invention, the term "user" may refer to a customer or the like, who utilizes an external apparatus such as a user device, for executing resource transfers or transactions. The external apparatus may be a user device (computing devices, mobile devices, smartphones, wearable devices, and the like), a payment instrument (credit cards, debit cards, checks, digital wallets, currency, loyalty points), and/or payment credentials (account numbers, payment instrument identifiers). In some embodiments, the user may seek to perform one or more user activities using a multi-channel cognitive resource application of the invention, which is stored on a user device. In some embodiments, the user may perform transactions by swiping payment instruments at a transaction terminal, for example, by swiping a magnetic strip of a credit card along a magnetic reader of a transaction terminal. In some embodiments, the transactions may be performed by wireless communication or "tapping" between the customer device and a transaction terminal. In accordance with some embodiments of the invention, the term "tap" or "tapping" may refer to bringing an external apparatus close to or within a predetermined proximity of the activity interface device or transaction terminal interface, or auxiliary user devices, so that information (such as encrypted tokens, financial resource/account identifiers, and the like) can be communicated wirelessly between the external apparatus and the devices using short range wireless transmission technology, such near-field communication (NFC) technology, radio-frequency (RF) technology, audio-frequency communication, or the like. Tapping may include physically tapping the user device against an appropriate portion of the auxiliary user device or the transaction terminal or it may include only waving or holding the user device near an appropriate portion of the auxiliary user device or the transaction terminal without making physical contact with the transaction terminal.

In accordance with embodiments of the invention, the term "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application. In accordance with embodiments of the invention, the term "module" with respect to an apparatus may refer to a hardware component of the apparatus, a software component of the apparatus, or a component of the apparatus that comprises both hardware and software. In accordance with embodiments of the invention, the term "chip" may refer to an integrated circuit, a microprocessor, a system-on-a-chip, a microcontroller, or the like that may either be integrated into the external apparatus or may be inserted and removed from the external apparatus by a user.

In accordance with embodiments of the invention, the term "electronic communication" may refer to a communication associated with a user, typically received, viewed and/or transmitted via a communication channel. In some embodiments, electronic communications may be associated with user communications (e.g., non-financial communications) relating to user travel, user appointments, etc. In some embodiments, electronic communications may be associated with user communications (e.g., financial communications) relating to user financial statements (e.g., tax statements, savings statements, shareholder notices, etc.), bill payments, etc. In some embodiments, communication channels may comprise cellular, audio, email, cellular messaging, website notification, mobile application notifications, etc.

As discussed previously, the drawbacks of conventional systems are numerous. In conventional systems, electronic communications are typically associated with numerous disparate communication channels, with each communication channel being associated with a specific communication media, technology application, protocols, communication transmission timing, and/or the like. Existing systems require a user to navigate multiple applications to access, view and perform electronic activities associated with discrete electronic communications on electronic devices. As such, a user is typically not only required to access each communication channel separately requiring increased processing and memory resources, but also access the communication channel repeatedly to access, view and perform electronic activities associated with electronic communications on electronic devices. Moreover, execution of the electronic activities requires the user to be adept with various distinct functions and technology elements of a myriad applications. As such, conducting electronic activities via the foregoing conventional system requires operations across several disparate communication channels, which may not be available to the user. Moreover, even if the disparate communication channels are available to the user, conducting electronic activities via the disparate communication channels is often extremely time consuming, cumbersome and unwieldy.

The intelligent, proactive and responsive system of the present invention provides a solution to the foregoing problems existing in conventional technology, and also provide other advantages. In this regard, the present invention is structured to integrate electronic communication data from numerous disparate communication channels, such that the activities associated with the disparate communication channels can be operated in an integrated manner, without requiring access to the each of the disparate communication channels.

Here, embodiments of the invention are directed to a "central communication hub" or a "central communication interface" or an "integrated interface" or an "integrated communication interface" (used interchangeably herein), which is structured such that the activities associated with the disparate communication channels can be operated in an integrated manner, without requiring access to the each of the disparate communication channels. Moreover, the "central communication hub" or a "central communication interface" or an "integrated interface" or an "integrated communication interface" (used interchangeably herein), are structured for integrating numerous financial and non-financial communication channels associated with the user, such that the user can utilize all associated channels via a central user application (e.g., multi-channel cognitive resource application with intelligent assistant functionality). The communications hub is structured for identifying, retrieving and organizing electronic communications (e.g., emails, financial communications, etc.) associated with the user from numerous disparate communication channels/media, as well as, automatically initiating actions associated with the electronic communications. The communications hub is also structured for transmitting alerts and notifications associated with a variety of financial and non-financial user activities (e.g., appointments). In some instances, the communications hub is configured to correlate user communications with the user's life plan. In some embodiments, the communications hub is configured to proactively initiate technology activities, e.g., in the form of to-do lists, program enrollment, bill pay, modify timing of the display of the communications, and other such actions based on the user's communications.

The central communication hub also comprises a system for centralized management of records, structured for secure and convenient storage, sharing and retrieval of user records. This can include intelligent automated management of records such as financial documents, non-financial documents and other user items. The system is also configured for transmitting proactive communications (e.g., notifications) to users for actions associated with the records, and guiding users through sequential record actions required for performing certain processes. The centralized management of records is integrated with the central user application (e.g., multi-channel cognitive resource application with intelligent assistant functionality) to simplify record retrieval, recommendations, and other actions.

FIG. 1 illustrates electronic communication configuration and intelligent transmission, and integrated resource processing platform environment 100, in accordance with one embodiment of the present invention. As illustrated in FIG. 1, a resource technology system 106, configured for providing an intelligent, proactive and responsive application or system, at a user device 104, which facilitates accessing, viewing and performing electronic activities associated with electronic communications across a variety of communication channels in an integrated manner and which is capable of centralized management of user records, without requiring the user to operate disparate communication channels. The application is also configured for execution of electronic activities in an integrated manner, and is capable of adapting to the user's natural communication and its various modes. The resource technology system 106 is operatively coupled, via a network 101 to one or more user devices 104, auxiliary user devices 170, to entity system(s) 180 (e.g., financial institution systems 180), entity databases 190, and other external systems/third-party servers not illustrated herein. In this way, the resource technology system 106 can send information to and receive information from multiple user devices 104 to provide an integrated platform with multi-channel cognitive resource capabilities to a user 102, and particularly to the user device 104. At least a portion of the intelligent configuration and transmission of electronic communications, and integrated resource processing technology, functionality and/or associated hardware is typically configured to reside on the user device 104 (for example, at the multi-channel cognitive resource user application 122 or central user application 122), on the system 106 (for example, at the multi-channel cognitive resource system application 144 or central system application 144), and/or on other devices and system and is an intelligent, proactive, responsive system that facilitates execution of electronic activities associated with user communications and user records in an integrated manner.

In some embodiments, the configuration and intelligent transmission of electronic communications and integrated resource processing platform is a central communication hub, structured for integrating numerous communication channels associated with the user, such that the user can utilize all associated channels via a central user application 122 (e.g., multi-channel cognitive resource application 122 having intelligent assistant functionality) provided, processed and/or operated by the resource technology system 106. In some embodiments, the communications hub is structured for identifying, retrieving and organizing communications (e.g., emails, financial communications, etc.) associated with the user, as well as, automatically initiating actions associated with the communications. In some embodiments, the communications hub is also structured for transmitting alerts and notifications associated with a variety of financial and non-financial user activities (e.g., appointments). In some embodiments, the communications hub is configured to correlate user communications with the user's life plan. In some embodiments, the communications hub is configured to proactively initiate to-do lists, program enrollment, bill pay, modify timing of the display of the communications, and other such actions based on the user's communications.

In some embodiments, the configuration and intelligent transmission of electronic communications and integrated resource processing platform, and the resource technology system 106 in particular, also comprises a system for centralized management of records, structured for secure and convenient storage, sharing and retrieval of user records. This can include intelligent automated management of records such as financial documents, non-financial documents and other user items. In some embodiments, the system 106 is also configured for transmitting proactive communications (e.g., notifications) to users for actions associated with the records, and guiding users through sequential record actions required for performing certain processes. In some embodiments, the centralized management of records is integrated with the central user application 122 (e.g., multi-channel cognitive resource application 122 with intelligent assistant functionality) to simplify record retrieval, recommendations, and other actions. Furthermore, in some embodiments, the central user application 122 (e.g., multi-channel cognitive resource application 122 with intelligent assistant functionality) is capable of seamlessly adapting to and switch between the user's natural communication and its various modes (such as speech or audio communication, textual communication in the user's preferred natural language, gestures and the like), and is typically infinitely customizable by the system 106 and/or the user 102.

The network 101 may be a global area network (GAN), such as the Internet, a wide area network (WAN), a local area network (LAN), or any other type of network or combination of networks. The network 101 may provide for wireline, wireless, or a combination wireline and wireless communication between devices on the network 101. The network 101 is configured to establish an operative connection between otherwise incompatible devices, for example establishing a communication channel, automatically and in real time, between the one or more user devices 104 and one or more of the auxiliary user devices 170, (for example, based on reeving a user input, or when the user device 104 is within a predetermined proximity or broadcast range of the auxiliary devices 170), as illustrated by communication channel 101a. Therefore, the system, via the network 101 may establish, operative connections between otherwise incompatible devices, for example by establishing a communication channel 101a between the one or more user devices 104 and the auxiliary user devices 170. In this regard, the network 101 (and particularly the communication channels 101a) may take the form of contactless interfaces, short range wireless transmission technology, such near-field communication (NFC) technology, Bluetooth® low energy (BLE) communication, audio frequency (AF) waves, wireless personal area network, radio-frequency (RF) technology, and/or other suitable communication channels. Tapping may include physically tapping the external apparatus, such as the user device 104, against an appropriate portion of the auxiliary user device 170 or it may include only waving or holding the external apparatus near an appropriate portion of the auxiliary user device without making physical contact with the auxiliary user device.

In some embodiments, the user 102 is a recipient of one or more electronic communications and/or the user 102 is associated with one or more records and other items. In some embodiments, the user 102 is an individual that wishes to conduct one or more activities with resource entities, for example using the user device 104. In some embodiments, the user 102 may access the resource technology system 106, the resource entity system 160, and/or the entity system 180 (e.g., a financial institution system 180) through a user interface comprising a webpage or a user application. Hereinafter, "user application" is used to refer to an application on the user device 104 of the user 102, a widget, a webpage accessed through a browser, and the like. As such, in some instances, the user device may have multiple user application stored/installed on the user device 104 and the memory device 116 in particular. In some embodiments, the user application is a multi-channel cognitive resource user application 122, also referred to as a central user application 122 or a user application 122 herein, provided by and stored on the user device 104 by the system 106. In some embodiments the user application 122 may refer to a third party application or a user application stored on a cloud used to access the resource technology system 106 and/or the auxiliary user device 170 through the network 101, communicate with or receive and interpret signals from auxiliary user devices 170, and the like. In some embodiments, the user application is stored on the memory device 140 of the resource technology system 106, and the user interface is presented on a display device of the user device 104, while in other embodiments, the user application is stored on the user device 104.

The user 102 may subsequently navigate through the interface, perform one or more searches or initiate one or more activities or resource transfers using a central user interface provided by the user application 122 of the user device 104. In some embodiments, the user 102 may be routed to a particular destination using the user device 104. In some embodiments, a purchase may be made by the user 102 using the user device 104. In some embodiments the auxiliary user device 170 requests and/or receives additional information from the resource technology system 106/the resource entity system 160 and/or the user device 104 for authenticating the user and/or the user device, determining appropriate transaction queues, performing the transactions and other functions.

FIG. 1 also illustrates the user device 104. The user device 104, herein referring to one or more user devices, wherein each device may generally comprise a communication device 110, a display device 112, a geo-positioning device 113, a processing device 114, and a memory device 116. Typically, the user device 104 is a computing system that allows a user 102 to interact with other systems to initiate or to complete activities, resource transfers, and transactions for products, and the like. The processing device 114 is operatively coupled to the communication device 110 and the memory device 116. The processing device 114 uses the communication device 110 to communicate with the network 101 and other devices on the network 101, such as, but not limited to the resource entity system 160, the auxiliary user device 170 and the resource technology system 106. As such, the communication device 110 generally comprises a modem, server, or other device for communicating with other devices on the network 101. In some embodiments the network 101 comprises a network of distributed servers. In some embodiments, the processing device 114 may be further coupled to a display device 112, a geo-positioning device 113, and/or a transmitter/receiver device, not indicated in FIG. 2. The display device 112 may comprise a screen, a speaker, a vibrating device or other devices configured to provide information to the user. In some embodiments, the display device 112 provides a presentation of the central user interface of the integrated user application 122. The geo-positioning device 113 may comprise global positioning system (GPS) devices, triangulation devices, accelerometers, and other devices configured to determine the current geographic location of the user device 104 with respect to satellites, transmitter/beacon devices, telecommunication towers and the like. In some embodiments the user device 104 may include authentication devices like fingerprint scanners, microphones and the like that are configured to receive bio-metric authentication credentials from the user.

The user device 104 comprises computer-readable instructions 120 stored in the memory device 116, which in one embodiment includes the computer-readable instructions 120 of the user application 122. In this way, users 102 may authenticate themselves, initiate activities, and interact with or receive and decode signals from the auxiliary user devices 170, communicate with the resource technology system 106, authorize a transaction, and/or complete a transaction using the central user interface of the user device 104. As discussed previously, the user device 104 may be, for example, a desktop personal computer, a mobile system, such as a cellular phone, smart phone, personal data assistant (PDA), laptop, wearable device, a smart TV, a smart speaker, a home automation hub, augmented/virtual reality devices, or the like. The computer readable instructions 120 such as computer readable/executable code of the multi-channel cognitive resource user application 122, when executed by the processing device 114 are configured to cause the user device 104 and/or processing device 114 to perform one or more steps described in this disclosure, or to cause other systems/devices to perform one or more steps described herein.

As further illustrated in FIG. 1, the resource technology system 106 generally comprises a communication device 136, at least one processing device 138, and a memory device 140. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 138 is operatively coupled to the communication device 136 and the memory device 140. The processing device 138 uses the communication device 136 to communicate with the network 101 and other devices on the network 101, such as, but not limited to the resource entity systems 160, auxiliary user devices 170 and/or the user device 104. As such, the communication device 136 generally comprises a modem, server, wireless transmitters or other devices for communicating with devices on the network 101. The memory device 140 typically comprises a non-transitory computer readable storage medium, comprising computer readable/executable instructions/code, such as the computer-readable instructions 142, as described below.

As further illustrated in FIG. 1, the resource technology system 106 comprises computer-readable instructions 142 or computer readable program code 142 stored in the memory device 140, which in one embodiment includes the computer-readable instructions 142 of a multi-channel cognitive resource system application 144 (also referred to as a "system application" 144). The computer readable instructions 142, when executed by the processing device 138 are configured to cause the system 106/processing device 138 to perform one or more steps described in this disclosure to cause out systems/devices (such as the user device 104, the user application 122, and the like) to perform one or more steps described herein. In some embodiments, the memory device 140 includes a data storage for storing data related to user transactions and resource entity information, but not limited to data created and/or used by the multi-channel cognitive resource system application 144.

FIG. 1 further illustrates one or more auxiliary user devices, in communication with the network 101. The auxiliary user devices may comprise peripheral devices such as speakers, microphones, smart speakers, and the like, display devices, a desktop personal computer, a mobile system, such as a cellular phone, smart phone, personal data assistant (PDA), laptop, wearable device, a smart TV, a smart speaker, a home automation hub, augmented/virtual reality devices, or the like.

In the embodiment illustrated in FIG. 1, and described throughout much of this specification, a "system" configured for performing one or more steps described herein refers to the multi-channel cognitive resource user application 122, that may perform one or more user activities either alone or in conjunction with the resource technology system 106, and specifically, the system application 144, one or more auxiliary user device 170, and the like The functions, and features of the configuration and intelligent transmission of electronic communications and integrated resource processing platform 100 will now be described in detail. As such, the configuration and intelligent transmission of electronic communications and integrated resource processing platform 100, and the multi-channel cognitive resource user application 122 (central user application 122) in particular, is configured to function as an intelligent personal assistant and resource navigator and is configured to (i) integrate a plurality of communication channels such that the corresponding electronic communications can be accede, viewed, modified and/or acted upon via a single central user interface, (ii) proactively and intelligently initiate and/or perform one or more electronic user activities associated with the electronic communications, e.g., by harnessing the functionality of multiple applications resident on the user device, and/or (iii) provide for centralized management of user records which is structured for secure and convenient storage, sharing and retrieval of user records. In particular, the system is configured to present an integrated central user interface for communicating with the user via natural language or conversation channels, for execution of one or more user activities, and for integrating the functionality of multiple applications in a single interface, without requiring the user to access the multiple applications individually and be proficient in their operation.

As such, the multi-channel cognitive resource user application 122 is configured to perform one or more user activities in a convenient and timely manner, via a central user interface of the application 122. In this regard, in some embodiments, the central user interface is presented on one or more user devices via the multi-channel cognitive resource user application 122 or another user application 122. The central user interface or multi-channel cognitive resource interface associated with the user application 122 may be presented on the display device 112 of the user device 104 in response to receiving an indication from the user (for example, receiving a voice command from the user with an identifier associated with the configuration and intelligent transmission of electronic communications and integrated resource processing platform, receiving a tactile indication or a fingerprint authentication from a home button of the device 104, successful authentication of authentication credentials and the like), automatically in response to detecting an action trigger (for example, determining that the user is attempting to perform a user activity by using a particular application, determining that a user resource is associated with a predetermined threshold value, determining that the user is at a predetermined location and the like), and the like.

Typically, the central user interface is a computer human interface, and specifically a natural language/conversation user interface for receiving user input (for example, for creating, selecting and modifying data/functionality), presenting information regarding user activities, providing output to the user, and otherwise communicating with the user in a natural language of the user, via suitable communication mediums such as audio, textual, and the like. The natural language of the user comprises linguistic phenomena such as verbs, phrases and clauses that are associated with the natural language of the user. The system is configured to receive, recognize and interpret these linguistic phenomena of the user input and perform user activities accordingly. In this regard, the system is configured for natural language processing and computational linguistics. In many instances, the system is intuitive, and is configured to anticipate user requirements, data required for a particular activity and the like, and request activity data from the user accordingly.

FIG. 2 illustrates a high level process flow 200 for establishing intelligent, proactive and responsive communication with a user, comprising a configuration and intelligent transmission of electronic communications and integrated resource processing platform for performing electronic activities in an integrated manner from a single interface, in accordance with some embodiments of the invention. FIGS. 3 and 4 illustrate schematic diagrams 300 and 400 of a central user interface, in accordance with some embodiments of the invention.

Although, the process flow 200 is described with respect to a user mobile device, it is understood that the process flow is applicable to a variety of other user devices. Furthermore, one or more steps described herein may be performed by the user mobile device 104, multi-channel cognitive resource user application 122, and/or the system 106. The multi-channel cognitive resource user application 122 stored on a user mobile device, is typically configured to launch, control, modify and operate applications stored on the mobile device. In this regard, the multi-channel cognitive resource user application facilitates the user to perform a user activity, such as a purchase transaction activity, using multiple applications from a centralized user interface (illustrated in FIGS. 3 and 4), without requiring the user to operate each of the disparate communication channels and without requiring the user to open and close one application after another. As noted previously, the centralized/central user interface may also be referred to as a "central communication hub" or a "central communication interface" or an "integrated interface", and/or an "integrated communication interface". The novel multi-channel functionality for seamless and automatic switching between communication channels is also described. Unless specified otherwise, henceforth one or more steps or activities performed by "the system" may refer to activities/steps performed by the resource technology system 106, and/or the user device 104, via, the multi-channel cognitive resource application (user application 122 and/or system application 144).

As indicated by block 202, the system is configured to provide a multi-channel cognitive resource application or user application 122 on a user device associated with the user. Providing the application may comprise transmitting, installing, storing, initiating and/or opening the user application 122 on the user device. The multi-channel cognitive resource application is further configured to present a central user interface on a display device 112 of the user device 104 (similar to the central user interfaces 300 and 400 illustrated in FIGS. 3 and 4). In some instances, the user device 104 is configured to present the multi-channel cognitive resource application, and the central user interface based on receiving control instructions from the system 106. In some instances, the multi-channel cognitive resource application may be running in the background on the user device, and the control instructions may cause the multi-channel cognitive resource application stored on the user device to present the central user interface on the display of the user device, automatically. In some embodiments, prior to initiating the presentation of the central user interface, the system may modify an existing display to allow the user to choose to, or prevent the user application from opening. The modification of the existing displays may comprise locking the screen for a predetermined period of time (such as 10 seconds) or until the user acquiesces the opening of the application by user voice, touch, or gesture commands. In addition, the system may also dim the brightness of the existing display for a predetermined period of time (such as 10 seconds) or until the user acquiesces the opening of the application by user voice, touch, or gesture commands, thereby reducing power requirements and drawing the user's attention. In some embodiments, based on determining that the user device does not comprise a multi-channel cognitive resource application, the system may transmit control instructions that cause the user device and/or facilitate the user to download and install the user integrated application. In some embodiments, the central user interface of the multi-channel cognitive resource application is similar to the interfaces illustrated and described with respect to FIGS. 3 and 4.

In this regard, in some embodiments, the system may initialize the multi-channel cognitive resource application or cause presentation of the central user interface based on (i) determining one or more electronic communications associated with user, (ii) determining that a user activity associated with an electronic communication is required to be performed within a predetermined time interval, (iii) determining that the user seeks to initiate a user activity, and/or the like.

Next, the system is configured to determine one or more electronic communications 230 (e.g., communications 232, notifications 236, records 234, etc.) associated with the user, wherein each electronic communication is associated with a communication channel 220, as indicated by block 204. Here, the system is configured to construct a central communications hub for integrated and consolidated management of user communications and records. In some embodiments the communication channels 220 may comprise one or more of a mobile communication channel associated with mobile device applications, widgets, etc., cellular communication channels such as cellular messaging, online communication channels associated browser applications, websites, etc., alerts, notifications, secure messages, electronic communications from other user/entity systems, secure messages from entity systems, resource transfer communications, news data (e.g., "data 1" illustrated in FIG. 3), research data (e.g., "data 2" illustrated in FIG. 3), and/or other communications channels. As such, the one or more electronic communications 230 may comprise communications 232 (e.g., associated with communication channels such as secure messaging, cellular messaging, email servers/cloud, communications from entity representatives via entity systems/servers, etc.), notifications 236 (e.g., associated with communication channels such as alerts and/or notifications via websites, applications, financial institution, etc.), records 234 (e.g., associated with communication channels such bill pay applications, statements/documents vault, will, trusts, property documents, insurance documents, other documents, identification documents, photos, digital subscription accounts, safe deposit instructions, etc.), news items, research items, and/or the like. In some embodiments, the records 234 may comprise statements (e.g., those associated with tax statements, enclosures, disclosures, shareholder notices, etc.). These one or more electronic communications are then presented, via the central user interface, to user, as illustrated by FIGS. 3-4. The one or more electronic communications may be ordered chronologically (e.g., in the form of the timeline illustrated by FIGS. 3-4), based on priority, based on user ordering, and/or the like.

The system is also structured to allow entity representatives (e.g., advisors) to share one or more electronic communications 230, such as records/documents 234 with the user, (e.g., for the purposes of user's signature, user's review, etc.). The system may then present these shared communications within the central user interface as well.

In some embodiments, the one or more electronic communications 230 may comprise communication associated with resource transfer notifications, person-to-person resource transfer requests, subscription and/or enrollment to entity services/content, notifications (e.g., those associated with communications added to the central user interface, check deposits, account information, savings goal reached updates, etc.), etc.

In some embodiments, the system allows for the user to upload or share electronic communications, which are then integrated into the central user interface by the system. In some embodiments, the system allows for the user to upload captured images and scans of the documents, that then converts them into electronic format.

Typically, the system is configured for (i) comprehensively organizing electronic communications (e.g., flagging critically important communications and records), (ii) locating and retrieving required records in a quick and efficient manner, and (iii) sharing the records with the relevant authorized users and entities in response to user requests (e.g., the user's accountant, family, lawyer, trusted contact, financial institution representative, etc.).

As discussed previously, in some embodiments, the central user interface is a computer human interface, and specifically a natural language/conversation user interface for receiving user input (for example, for creating, selecting and modifying data/functionality), presenting information regarding user activities, providing output to the user, and otherwise communicating with the user in a natural language of the user, via suitable communication mediums such as audio, textual, and the like. A "conversation" as referred to herein may comprise receiving a user input using a suitable communication channel/medium, providing an output to the user using a suitable communication channel/medium, a dialog or interchange comprising receiving one or more user input and providing relevant one or more outputs, and the like. Typically, the conversation components, i.e., the user input received, and the output provided by the application are in the natural language of the user, often comprising linguistic phenomena such as verbs, phrases and clauses, as will be described below. As such, the system is configured for natural language communication across multiple communication channels (such as, speech/audio, text, and the like), and is configured to switch between them seamlessly and in real-time, during the conversation.

Based on analyzing a first electronic communication of the plurality of electronic communications, the system is configured to determine a first user activity associated with the first electronic communication, as indicated by block 206. As such the system is configured for proactively determining user activities to be undertaken for the electronic communications. Here, the system is configured to receive, recognize and interpret these linguistic phenomena of the electronic communications and perform user activities accordingly. In this regard, the system is configured for natural language processing and computational linguistics. Here, in general, the system may parse the electronic communications 230 to detect one or more words that are indicative of a user activity 240 to be performed. The system may then analyze words, images, icons, hyperlinks, etc., in the electronic communications to determine the user activity. For example, the system may analyze the one or more words to determine that the electronic communications (and or an attachment included in the electronic communications) to is associated with a user activity of paying a utility bill, for example, based on identifying keywords such as, "pay" and "bill". The system may then proactively proceed to perform the bill payment through the central user interface. Here, the system may automatically formulate the bill payment 242 for the required amount indicated in the electronic communication, such that a mere user confirmation is required for completion of the bill payment, as indicated by FIG. 4.

In some embodiments, the system may determine that a particular user record 234 of the one or more electronic communications 230 requires a signature from the user for further processing. Here, the system may determine the user activity 240 to be a reminding the user to review and sign the record 244, as illustrated by FIG. 3. The system may then allow the user to view, review and sign the record from the central user interface.

In some embodiments, the system may determine that a particular user record 233 of the one or more electronic communications 230 is associated with (contains or requires scheduling of) an appointment for the user with another user or entity. Here, the system may determine the user activity 240 to be (i) proactively scheduling the appointment (e.g., based on first reviewing the user's calendar for availability), (ii) reminding user the regarding the appointment 246, as illustrated by FIG. 3, (iii) packaging documents required for the appointment, (iv) reminding the user to sign required documents prior to the appointment, and/or the like. As such, the system is capable of proactively performing user activities such as enrolling the user for certain relevant alerts or alert bundles, set reminders, make appointments, confirm appointments, etc.

In some embodiments, the system may determine that the user is required to be alerted about a particular electronic communication 230. Here, the system may determine the user activity 240 to be a transmitting the relevant alerts to the user, e.g., within the central user interface such as system security alert 250 indicating a log in into another user device (different from the user device that is displaying the central user interface), in real-time, illustrated by FIG. 4. In some embodiments, the system is configured for dynamically reassessing existing alerts and notifications and their priority, creating alert bundles of similar alerts or alerts requiring action within the same time window, setting-up push alerts from user desktop, unrolling alerts from the central user interface, automatic enrollment in key alerts or alert bundles (e.g., security alerts), etc.

Moreover, as illustrated by FIG. 4, the system may construct dynamic user interface control elements 260, that are structured to perform one or more activities associated with the electronic communications. The system may determine a current user action area 262 associated with the user. The current user action area may refer to a portion of the central user interface that the user is currently looking at (e.g., determined based on a direction of the user's gaze via image capture devices of the user device) and/or a portion of the central user interface that the user is acting upon (e.g., determined based on user touch gestures, user scroll gestures, mouse pointer location, etc.). The system may then dynamically overlay a presentation of the dynamic user interface control elements 260 within the current user action area associated with the user. In some embodiments, the dynamic user interface control elements 260 may be dynamically constructed and customized to the particular electronic communication with activities/actions/tasks associated with the characteristics of the electronic communication. In some embodiments, the dynamic user interface control elements 260 may be structured for allowing the user to customize displays of electronic communications, and/or activities/actions/tasks associated with the electronic communication. The dynamic user interface control elements 260 may allow the user to perform the associated activities via the current user action area, without having to modify the rest of the interface.

In some embodiments, the system may determine based on analyzing an electronic communication 230, that the user will be travelling for a predetermined time interval. Here, the system may determine the user activity 240 to include holding emails and other communications during the predetermined travel time interval.

In some embodiments, the system is also configured for organizing user communications into relevant folders or bundles, delete and perform clean-up of expired or no longer relevant communications, allow the user to share communications with other users (e.g., via social media), etc., via the central user interface.

In some embodiments, the system is configured for correlating electronic communications with the user's life plan and goals.

Next, the system initiates completion of the first user activity within the central user interface of the multi-channel cognitive resource application, as indicated by block 208. In some embodiments, the system is configured to identify one or more discrete activity events to be carried out for performing the first user activity. For example, for a determined user activity of a resource transfer, the system may determine user activity events of receiving a source account information, receiving a destination account information, receiving a transfer amount, receiving and validating authentication credentials and the like. The system may then present outputs within the central user interface to request the information from the user, in a suitable order.

Typically, the system is structured to guide users through sequential record actions required for performing certain processes, such as home loans, goal planning, setting-up a new business etc. For example, for setting-up a new business by the user, the system may guide the user through the sequential phases of (i) business planning (e.g., involving the steps of creating a business plan, business registration, forming a corporate charter, etc.), (ii) opening the business (e.g., involving the steps of opening financial accounts for the business, etc.), (iii) raising funding (e.g., involving the steps of obtaining business loans, funding prospectus, etc.), (iv) managing business accounts (e.g., involving the steps of managing liquidity, diversification, concentration, etc.), and/or (v) employee account management (e.g., involving the steps of opening 401K plans for employees, stock options, etc.). As another example, for a home loan for the user, the system may guide the user through the sequential phases of (i) finding a home (e.g., involving the steps of creating a prequalification letter, etc.), (ii) identifying rates (e.g., involving the steps of obtaining rate locks, etc.), (iii) applying for the loan (e.g., involving the steps of completing the application stages, etc.), (iv) transmitting loan documents (e.g., involving the steps of uploading documents such as paystubs, etc.), and/or (v) finalizing (e.g., involving the steps of opening approval letter download, finalizing purchase by sharing documents with a notary for obtaining seal, etc.).

In this regard, the integrated user application is configured to dynamically integrate, or embed, data and functionality (action buttons or tools such as, other interface elements), entity identifiers (such as logos, images and the like) of resource entity applications or applications/widgets stored on the user device within the centralized user interface. As such, the application is configured to present the conversation, functionality of the multi-channel cognitive resource application, user activity inputs, outputs, along with functionality/elements extracted from other applications or resource entity applications. Here, the integrated user application is configured to dynamically integrate, or embed, resource entity interfaces, one after another in a sequence, based on a determined progression of the user activity and activity events. In some instances, the integrated user application may load only required portions of the entity applications in a cache memory location, one after another. The user application is further configured to close out or unload each resource entity application from memory after completion of associated activity event. Therefore, because the present invention does not require opening of multiple interfaces, and because the present invention does not require the resource entity applicants to be running in the background throughout the user activity, the present user application provides an improvement to exiting user activity processing, and an increase in processing speeds and a reduction in memory requirements and processing time for the mobile device.

As a non-limiting illustrative example, the system may determine a user activity of purchasing a first product from a first merchant/resource entity based on a first electronic communication. In response, the system may determine that the first user activity comprises a first activity event of choosing the first product out of available options or configurations at the first merchant. The system may then access another application of the user device associated with the first merchant, for example, by providing user authentication credentials, and extract application elements (application functionality, media, images, and the like) associated with the first product and available configurations. The system may then embed these extracted elements into the central user interface along with one or more interactive elements 224 to facilitate selection of the products and configurations from the user, as a first output. Based on receiving a suitable selection as a second activity input from the user, the system may then initiate a determined second activity event of invoking a shopping list of the user from the merchant application and embedding the elements in the central user interface as a subsequent second output, to facilitate receiving user confirmation (i.e., third activity input). The system may further determine a third event activity of adding an added resource (e.g., offer, rebate, etc.) to the first activity. In this regard, the system may determine added resources (e.g., offers, rebates, etc.) from the merchant application, a coupon application, a digital wallet application, loyalty point application, and the like and embed pertinent elements into the central user interface as a third output to enable the user to choose one or more added resources (e.g., offers, rebates, etc.) for applying to the purchase of the first product, as a fourth activity input.

The system may then commence a fifth event activity of initiating payment for the purchase, and the like, via the central user interface. In this regard, the system may request authentication credentials, passcodes, financial instrument information, payment confirmation and the like via an output display 212 within the central user interface, as a fourth output. The system may receive corresponding fifth activity input within the central user interface and perform the purchase transaction, for example using a digital wallet application, and display a receipt confirmation and the like as a fifth output display in the central user interface. Therefore, the user may perform one or more user activities from within the central user interface, via a conversation. The activity inputs from the user and the outputs may be displayed in a sequential manner in the central user interface, for example, in a chat display format.

As discussed, the system is further configured to authenticate the user for the user activity, either before or during the activity. In this regard, the user application is configured to provide centralized authentication, without requiring separate credentials for each resource entity application associated with the user activity. In some embodiments, the system is configured to identify the one or more activity events and the one or more external applications or resource entity applications required, for completing the activity events, prior to commencing the activity events. Here, the integrated user application is configured to determine authentication requirements of each of the identified one or more applications associated with completing the user activity. The integrated user application may then identify a highest level of authentication among the applications. Continuing with the previous example, the user application may identify that a mobile wallet application requiring biometric authentication is a higher level of authentication than the coupon application requiring a passcode. In response to determining the highest level of authentication, the user application may request credentials associated with the highest level of authentication from the user. The successful validation of the received credentials associated with the highest level of authentication from the user, by the mobile device, is typically configured to authenticate the user for the other resource entity applications associated with the activity as well, without requiring separate authentication credentials, thereby reducing processing time.

As such, the system is configured to employ the foregoing technical features of the configuration and intelligent transmission of electronic communications and integrated resource processing to perform a myriad of user activities. In this regard, the system is configured to harness and present the content and functionality of a plurality of applications, typically associated with execution of a user activity, in the central user interface. The various functions and features of the central user interface/multi-channel cognitive resource interface, will now be described herein. It is understood that these functions and features employ some or all of the aforementioned technical features.

User Interface Navigation and Activity Implementation

As such, the system is configured to intuitively conduct complex conversations with the user using a suitable communication channel (or a suitable combination of communication channels), at least partially within the central user interface. In this regard, the system is configured to provide information to the user, in response to a trigger, such as a user input or short question, without requiring the user to access and navigate multiple applications and their interfaces. For instance, the system is configured to provide, in real time, relevant and concise information regarding user account balances, user account alerts, recent transactions, payment due dates, recurring payments, scheduled deposits/payments, location of nearby ATMs, account detail attributes, personalized offers, and the like (for example, after determining successful validation of user authentication credentials within a predetermined time period). In some instances, the system is configured to answer frequently asked questions in various categories. In some instances, the system is equipped with a search functionality and is configured to retrieve pertinent information, application functionality, help topics and the like.

As alluded to previously, the system is also configured to execute complex tasks within a single central user interface. For a user activity of making a purchase, the user may be required to access an authentication application, a merchant application, a digital wallet application and the like, separately and in a particular order. Instead, the present invention, provides an improvement over existing technology by performing the user activity within the central user interface, precluding the transfer of the user to multiple interfaces. The system automatically determines a conversation path for seeking and receiving user authentication credentials, product information (by retrieving a displaying content and audio visual elements of a merchant interface or a shopping list interface, within the central user interface), user added resource program information, and choice of a payment instrument for a digital wallet, and the like, in a suitable order, within the central user interface. Accordingly, the system may then, automatically, initiate the purchase based on communication with a merchant system and then present a receipt of the purchase within the central user interface. For instance, the system is also configured to perform the following user activities within the user interface: payment transfers, transfer of funds between user accounts, bill payments, creating/modifying spend levels by product categories or by merchants, modifying scheduled transfers, scheduling appointments with an associate, replacing a debit/credit card, creating travel flags, enrolling in alerts and locking/unlocking user debit/credit cards.

In some embodiments, the system is further configured to transfer the user to another suitable interface for at least partially completing a user activity. For example, the user may invoke the multi-channel cognitive resource user application using an audio input regarding depositing a check. The multi-channel cognitive resource user application may then, automatically, initiate a visual capture device of the user device, and invoke the associated application interface for the user to capture an image of the check. Here, although the visual capture interface is presented, the multi-channel cognitive resource user application associated with the central user interface is typically configured to run in the background, and receive and respond to communication from the user. In response to determining that the image of the check has been captured, the system may initiate a presentation of the captured image within the central user interface, and proceed with the check deposit. Furthermore, the system may invoke one or more optical character recognition (OCR) applications to determine textual information associated with the check. The system may populate the determined text in the central user interface and enable the user to make any changes if necessary, before proceeding with the deposit. In a similar manner, the system may enable the user to activate a new debit or credit card by capturing an image of the card, in real time. As another example, the system is configured to scan one or more QR codes while the user is visiting a location, such as a financial institution or a merchant location. The system may populate information or personalized added resources (e.g., offers, rebates, etc.) associated with the scanned codes in the central user interface, at a later time for the user's review.

Other examples of user activities involving transfer of control from the multi-channel cognitive resource user application include wire transfers, addition of payee, redeeming rewards, reporting lost cards, ordering checks, change or address, modifying authentication credentials/passwords, researching products, receive personalized offers, opening additional accounts and the like. That said, the system is also configured to transfer control to another application entirely. For example, during a conversation with the user, the system may anticipate that resolution of the user activity may require assistance of an associate. The system may then initiate a call or a chat with an available associate, while continuing the conversation with the user, thereby saving time. Next, the system may present an entity interface for initiation of the conversation with the associate, thereby transferring control to the entity interface.

Cognitive, Intuitive and Anticipatory Features

In addition to the responsive functions described above, the system is also configured for proactive and predictive functions. In this regard, the system is configured to anticipate user requirements and assist user in completion of one or more user activities. In this regard, the system is configured for tactical resource management. Here the system is configured to alert the user, for example via the central user interface, regarding unusual transactions, real-time budget monitoring, unusually high spending in a category, highlighting reoccurring subscription payments before they are up for renewal, deposits to user accounts and the like. In addition, the system is configured to provide forecast of account balances, help the user prevent the account balance from falling below a predetermined limit, remind the user to initiate bill payments in a timely manner, and the like.

In this regard, the aforementioned factors may be passive triggers that are either information or do not require immediate action, and active triggers that require action from the user within a predetermined amount of time. In some instances, the system may present active and/or passive triggers in response to determining that the user has accessed the multi-channel cognitive resource user application and/or another predetermined application. In some instances the system may present the active triggers, such as account balance thresholds, unusual activity alerts, and the like, by transmitting auditory or vibratory alerts that cause the user device to present the central user application, automatically, and in real-time. In some instances, with respect to the passive triggers, such as account recommendations, personalized offers and the like, the system may initiate presentation of the associated information after performing sentiment and tonal analysis. In this regard, the system may analyze user and device characteristics for a predetermined period of time, such as analyze current device usage patterns (for example, determining whether the user is currently involved in completing a user activity, determining whether the user is merely browsing a social media account, determining that the user is currently travelling and being routed to a particular location, and the like), perform tonal analysis (for example, determine that the user is in a hurry based on detecting predetermined vocal parameters in the user's voice), perform sentiment analysis (for example, analyze the user's facial expressions when the user is utilizing an image capture device), user device location, and the like. The system may then initiate presentation of information associated with passive triggers based on determining predetermined characteristics (for example, determining that the user is at the user residence, and/or determining that the user is not associated with a user activity, either currently or in the near future).

In addition, the system is typically configured for strategic management of the user's resources. In this regard, the system may be equipped with a detection feature for determining idle resources, unspent resources for each month, windfall deposits, changes in incoming resources, completion of goals, ceasing/completion of recurring transfers/expenses, and the like. In response, the system may suggest user management actions to mitigate potential problems and/or better manage and grow resources, to save and invest. The system may further educate the user in one or more financial topics for strategic management of the user's resources. In some instances, the system is configured to provide personalized decision support/guidance, for example, to help the user decide between multiple user management actions, by providing user specific information to enable the user to make an informed choice. Here, the system is configured to guide the user through complex, multi-line management decisions. For example, the system may assist the user is saving, investing, and resource transfer decisions, for instance, based on user information and user resource usage pattern, based on detecting life events associated with the user and the like. As another example, the system may suggest that the user may save a first amount by paying down an automobile loan faster instead of entertainment expenditures. As another example, based on determining that the user's account usually has a second amount on average at the end of every month, the system may suggest saving the second amount towards retirement, education and the like. The strategic management information is presented, in some embodiments, in a similar manner described with respect to passive triggers.

Furthermore, in response to the tactical resource management and strategic resource management described above, the system is configured to implement and complete one or more user resource management actions/activities. For example, the system may help the user perform one-time resource transfers, setup recurring transfers, create goals, open new accounts, provide information about saving and investing, and the like.

Electronic Activity Integration Features

The system is further configured to serve as a concierge for initiation and completion of user activities and auxiliary tasks, from the single central user interface. For example, for the user activity for purchasing flight tickets for an upcoming trip, the system may perform one or more user activities, comprising presenting suitable ticket options for the user, ordering the options based on a user specified criteria, and reserving the tickets and completing the purchase. In addition, the system may perform one or more associated auxiliary activities such as, reserving hotel accommodations, providing travel insurance, and the like. As such, the system enables initiation and completion of the purchases and resource transfers from the central user interface, as discussed previously. As another example, based on determining a passive trigger comprising a life event of the user expecting the birth of a child, the system may undertake auxiliary activities such as presenting information associated with new automobiles suited for a child, housing options and the like.

In some embodiments, the system, and specifically the multi-channel cognitive resource user application 122 of the user device 104 is configured to establish operative communication channels with auxiliary user devices 170, operating systems/personal assistants associated with the auxiliary user devices 170, and/or other personal assistants associated with the user device 104 itself. For example, the user application and hence the central user interface, is configured to communicate with other auxiliary devices such as smart appliances, home automation hubs, thermostats, sensors and other Wi-Fi or near-field or audio wave communication enabled devices, to determine usage patterns, to automatically turn the devices on and off based on usage requirements to produce energy and financial savings, and the like, for example after requisite authentication verification. As another example, the system is configured for seamless integration with existing personal digital assistants of the user device, and transfer control to and from the assistants, in real time, for execution of user activities. In some embodiments, the system is configured to communicate with auxiliary devices such as virtual reality (VR) headsets, augmented reality (AR) devices and the like. In this regard, the system may initiate presentation of the central user interface, seamlessly, on displays associated with the axially VR and AR devices. In some instances, the system is configured to transfer an existing conversation of the multi-channel cognitive resource user application to other personal digital assistant interfaces or other auxiliary device, for performance of further steps. In this regard, the system is configured to update the personal digital assistant or the auxiliary device regarding the most recent dialogue, future activities/steps to be performed, status of the current conversation, and the like.

As another example, the system is configured for voice biometrics, and is configured to authenticate the user based on the user's audio credentials, both for the multi-channel cognitive resource user application and other applications of the user device, and also as a centralized authentication means for the one or more auxiliary devices. In this regard, the system may convey indications of successful authentication of the user to one or more auxiliary devices.

FIG. 5 illustrates a high-level process flow of a language processing module 500 of the configuration and intelligent transmission of electronic communications and integrated resource processing application, in accordance with some embodiments of the invention. The language processing module 500 is typically a part of the multi-channel cognitive resource application of the user device, although in some instances the language processing module resides on the system 106. As discussed earlier, the natural language of the user comprises linguistic phenomena such as verbs, phrases and clauses that are associated with the natural language of the user. The system, and the language processing module 500 in particular, is configured to receive, recognize and interpret these linguistic phenomena of the user input and perform user activities accordingly. In this regard, the language processing module 500 is configured for natural language processing and computational linguistics. As illustrated in FIG. 5, the language processing module 500 includes a receiver 535 (such as a microphone, a touch screen or another user input or output device), a language processor 505 and a service invoker 510.

Receiver 535 receives an activity input 515 from the user, such as a spoken statement 515 provided using an audio communication medium. Although described with respect to an audio communication medium, the language processing module 500 is not limited to this medium and is configured to operate on input received through other mediums such as textual input, graphical input (such as sentences/phrases in images or videos), and the like. As an example, the user may provide an activity input comprising the sentence "I want to pay my June internet bill". The receiver 535 may receive the spoken statement 515 and forward the spoken statement 515 to the language processor 505. An example algorithm for the receiver 535 is as follows: wait for activity input; receive activity input; pick up activity input; receive spoken statement 515; and forward spoken statement 515 to language processor 505.

The language processor 505 receives spoken statement 515 and processes spoken statement 515 to determine an appropriate activity 520 or activity event 520 to invoke to respond to activity input and any parameters 525 needed to invoke activity 520. The language processor 505 may detect a plurality of words 540 in spoken statement 515. Using the previous example, words 540 may include: pay, June, internet, and bill. The language processor 505 may process the detected words 540 to determine the activity 520 to invoke to respond to activity input.

The language processor 505 may generate a parse tree based on the detected words 540. Parse tree may indicate the language structure of spoken statement 515. Using the previous example, parse tree may indicate a verb and infinitive combination of "want" and "to pay" and an object of "bill" with the modifiers of "June" and "internet." The language processor 505 may then analyze the parse tree to determine the intent of the user and the activity associated with the conversation to be performed. For example, based on the example parse tree, the language processor 505 may determine that the user wants to pay a bill.

The language processor 505 may also determine from the parse tree that "bill" is modified by "June" and "internet." The language processor 505 may extract "June" and "internet" as values for parameters 525 (e.g. date and type parameters) to the bill pay activity 520. The values of the parameters 525 may be "June" and "internet." The language processor 505 may then forward the determined activity 520 and the values of the parameters 525 to service invoker 510.

An example algorithm for the language processor 505 is as follows: wait for spoken statement 515; receive spoken statement 515 from receiver 535; parse spoken statement 515 to detect one or more words 540; generate parse tree using the words 540; detect an intent of the user by analyzing parse tree; use the detected intent to determine a service to invoke; extract values for parameters from parse tree; and forward activity 520 and the values of parameters 525 to service invoker 510.

Next, the service invoker 510 receives determined activity 520 comprising required functionality and the parameters 525 from the language processor 505. The service invoker 510 may analyze activity 520 and the values of parameters 525 to generate a command 550. Command 550 may then be sent to instruct that activity 520 be invoked using the values of parameters 525. In response, the language processor 505 may invoke a bill pay functionality of an internet provider resource application of the user device, for example, by extracting pertinent elements and embedding them within the central user interface as discussed previously. An example algorithm for service invoker 510 is as follows: wait for activity 520; receive activity 520 from the language processor 505; receive the values of parameters 525 from the language processor 505; generate a command 550 to invoke the received activity 520 using the values of parameters 525; and communicate command 550 to invoke activity 520.

In some embodiments, the system also includes a transmitter that transmits audible signals, such as questions, requests and confirmations, back to the user. For example, if the language processor 505 determines that there is not enough information in spoken statement 515 to determine which activity 520 should be invoked, then the transmitter may communicate an audible question back to the user for the user to answer. The answer may be communicated as another spoken statement 515 that the language processor 505 can process to determine which activity 520 should be invoked. As another example, the transmitter may communicate a textual request back to the user. If the language processor 505 determines that certain parameters 525 are needed to invoke a determined activity 520 but that the user has not provided the values of these parameters 525. For example, if the user had initially stated "I want to pay my bill," the language processor 505 may determine that certain values for parameter 525 are missing. In response, the transmitter may communicate the audible request "do you want to pay your telephone, internet or television bill?" As yet another example, the transmitter may communicate an audible confirmation that the determined activity 520 has been invoked. Using the previous example, the transmitter may communicate an audible confirmation stating "Great, let me forward you to the internet bill pay service." In this manner, the system may dynamically interact with the user to determine the appropriate activity 520 to invoke to respond to the user.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for configuration and intelligent transmission of electronic communications and integrated resource processing, comprising a multi-channel cognitive resource platform for operating electronic communications from a plurality of communication channels in an integrated manner from a single interface, the system comprising:
   at least one memory device with computer-readable program code stored thereon;
   at least one communication device;
   at least one processing device operatively coupled to the at least one memory device and the at least one communication device, wherein executing the computer-readable program code is configured to cause the at least one processing device to:
      provide a multi-channel cognitive resource application on a user device associated with the user, wherein the multi-channel cognitive resource application is configured to present a central user interface on a display device of the user device, wherein the multi-channel cognitive resource application is structured to run in the background on the user device;
      determine one or more electronic communications associated with the user, wherein each electronic communication is associated with a communication channel;
      present, via the central user interface, the one or more electronic communications to user by automatically activating the multi-channel cognitive resource application running in the background;
      determine a first user activity associated with a first electronic communication of the one or more electronic communications;
      determine one or more applications associated with completion of the first user activity;
      determine an authentication level associated with each of the one or more applications;
      determine a highest authentication level of the one or more authentication levels associated with the one or more applications;
      request one or more authentication credentials from the user via the central user interface of the multi-channel cognitive resource application such that the one or more authentication credentials match the determined highest authentication level;
      load one or more portions of interfaces associated with the one or more applications in a cache memory location;
      determine a progression associated with the first user activity;
      present the one or more portions of interfaces associated with the one or more applications in an order associated with the determined progression associated with the first user activity;
      initiate completion of the first user activity within the central user interface of the multi-channel cognitive resource application; and
      in response to completion of the first user activity, unload the one or more portions of interfaces and close the one or more applications.

2. The system of claim 1, wherein determining the first user activity associated with the first electronic communication of the one or more electronic communications, further comprises:
   parsing the first electronic communication of the one or more electronic communications to determine whether the first electronic communication comprises one or more activity keywords; and
   determining that the one or more activity keywords are associated with the first user activity.

3. The system of claim 1, wherein initiating completion of the first user activity within the central user interface further comprises:
   conducting, via the central user interface, a first conversation with the user, wherein conducting the first conversation comprises:
      receiving, via the central user interface, a first activity input from the user regarding the first user activity, wherein the activity input is received through a first communication medium; and
      presenting, via the central user interface, the received first activity input from the user.

4. The system of claim 1, wherein initiating completion of the first user activity within the central user interface further comprises:
   determining one or more parameters required for completing the first user activity;
   parsing the one or more electronic communications to determine whether the one or more electronic communications comprise at least one of the one or more parameters; and
   in response to determining that the one or more electronic communications comprise at least one of the one or more parameters, performing the first user activity.

5. The system of claim 1, wherein the one or more electronic communications comprise the first electronic communication associated with a first communication channel, and a second electronic communication associated with a second communication channel different from the first communication channel.

6. The system of claim 1, wherein the one or more electronic communications comprise one or more records associated with the user.

7. A computer program product for configuration and intelligent transmission of electronic communications and integrated resource processing, wherein the computer program product is configured to provide a multi-channel cognitive resource platform for operating electronic communications from a plurality of communication channels in an integrated manner from a single interface, the computer program product comprising a non-transitory computer-readable storage medium having computer-executable instructions to:

provide a multi-channel cognitive resource application on a user device associated with the user, wherein the multi-channel cognitive resource application is configured to present a central user interface on a display device of the user device, wherein the multi-channel cognitive resource application is structured to run in the background on the user device;

determine one or more electronic communications associated with the user, wherein each electronic communication is associated with a communication channel;

present, via the central user interface, the one or more electronic communications to user by automatically activating the multi-channel cognitive resource application running in the background;

determine a first user activity associated with a first electronic communication of the one or more electronic communications;

determine one or more applications associated with completion of the first user activity;

determine an authentication level associated with each of the one or more applications;

determine a highest authentication level of the one or more authentication levels associated with the one or more applications;

request one or more authentication credentials from the user via the central user interface of the multi-channel cognitive resource application such that the one or more authentication credentials match the determined highest authentication level;

load one or more portions of interfaces associated with the one or more applications in a cache memory location;

determine a progression associated with the first user activity;

present the one or more portions of interfaces associated with the one or more applications in an order associated with the determined progression associated with the first user activity;

initiate completion of the first user activity within the central user interface of the multi-channel cognitive resource application; and in response to completion of the first user activity, unload the one or more portions of interfaces and close the one or more applications.

8. The computer program product of claim 7, wherein determining the first user activity associated with the first electronic communication of the one or more electronic communications, further comprises:

parsing the first electronic communication of the one or more electronic communications to determine whether the first electronic communication comprises one or more activity keywords; and determining that the one or more activity keywords are associated with the first user activity.

9. The computer program product of claim 7, wherein initiating completion of the first user activity within the central user interface further comprises:

conducting, via the central user interface, a first conversation with the user, wherein conducting the first conversation comprises:

receiving, via the central user interface, a first activity input from the user regarding the first user activity, wherein the activity input is received through a first communication medium; and presenting, via the central user interface, the received first activity input from the user.

10. The computer program product of claim 7, wherein initiating completion of the first user activity within the central user interface further comprises:

determining one or more parameters required for completing the first user activity;

parsing the one or more electronic communications to determine whether the one or more electronic communications comprise at least one of the one or more parameters; and in response to determining that the one or more electronic communications comprise at least one of the one or more parameters, performing the first user activity.

11. The computer program product of claim 7, wherein the one or more electronic communications comprise the first electronic communication associated with a first communication channel, and a second electronic communication associated with a second communication channel different from the first communication channel.

12. The computer program product of claim 7, wherein the one or more electronic communications comprise one or more records associated with the user.

13. A computer implemented method for configuration and intelligent transmission of electronic communications and integrated resource processing, wherein the computer implemented method is configured to provide a multi-channel cognitive resource platform for operating electronic communications from a plurality of communication channels in an integrated manner from a single interface, the computer implemented method comprising:

providing a multi-channel cognitive resource application on a user device associated with the user, wherein the multi-channel cognitive resource application is configured to present a central user interface on a display device of the user device, wherein the multi-channel cognitive resource application is structured to run in the background on the user device;

determining one or more electronic communications associated with the user, wherein each electronic communication is associated with a communication channel;

presenting, via the central user interface, the one or more electronic communications to user by automatically activating the multi-channel cognitive resource application running in the background;

determining a first user activity associated with a first electronic communication of the one or more electronic communications;

determining one or more applications associated with completion of the first user activity;

determining an authentication level associated with each of the one or more applications;

determining a highest authentication level of the one or more authentication levels associated with the one or more applications;

requesting one or more authentication credentials from the user via the central user interface of the multi-channel cognitive resource application such that the one or more authentication credentials match the determined highest authentication level;

loading one or more portions of interfaces associated with the one or more applications in a cache memory location;

determining a progression associated with the first user activity;

presenting the one or more portions of interfaces associated with the one or more applications in an order associated with the determined progression associated with the first user activity;

initiating completion of the first user activity within the central user interface of the multi-channel cognitive resource application; and in response to completion of the first user activity, unloading the one or more portions of interfaces and close the one or more applications.

14. The computer implemented method of claim 13, wherein determining the first user activity associated with the first electronic communication of the one or more electronic communications, further comprises:

parsing the first electronic communication of the one or more electronic communications to determine whether the first electronic communication comprises one or more activity keywords; and determining that the one or more activity keywords are associated with the first user activity.

15. The computer implemented method of claim 13, wherein initiating completion of the first user activity within the central user interface further comprises:

conducting, via the central user interface, a first conversation with the user, wherein conducting the first conversation comprises:

receiving, via the central user interface, a first activity input from the user regarding the first user activity, wherein the activity input is received through a first communication medium; and presenting, via the central user interface, the received first activity input from the user.

16. The computer implemented method of claim 13, wherein initiating completion of the first user activity within the central user interface further comprises:

determining one or more parameters required for completing the first user activity;

parsing the one or more electronic communications to determine whether the one or more electronic communications comprise at least one of the one or more parameters; and in response to determining that the one or more electronic communications comprise at least one of the one or more parameters, performing the first user activity.

17. The computer implemented method of claim 13, wherein the one or more electronic communications comprise the first electronic communication associated with a first communication channel, and a second electronic communication associated with a second communication channel different from the first communication channel.

18. The computer implemented method of claim 13, wherein the one or more electronic communications comprise one or more records associated with the user.

* * * * *